March 10, 1936.   R. J. S. PIGOTT ET AL   2,033,588
MACHINE FOR TESTING BEARINGS AND LUBRICANTS
Filed May 14, 1935   3 Sheets-Sheet 1
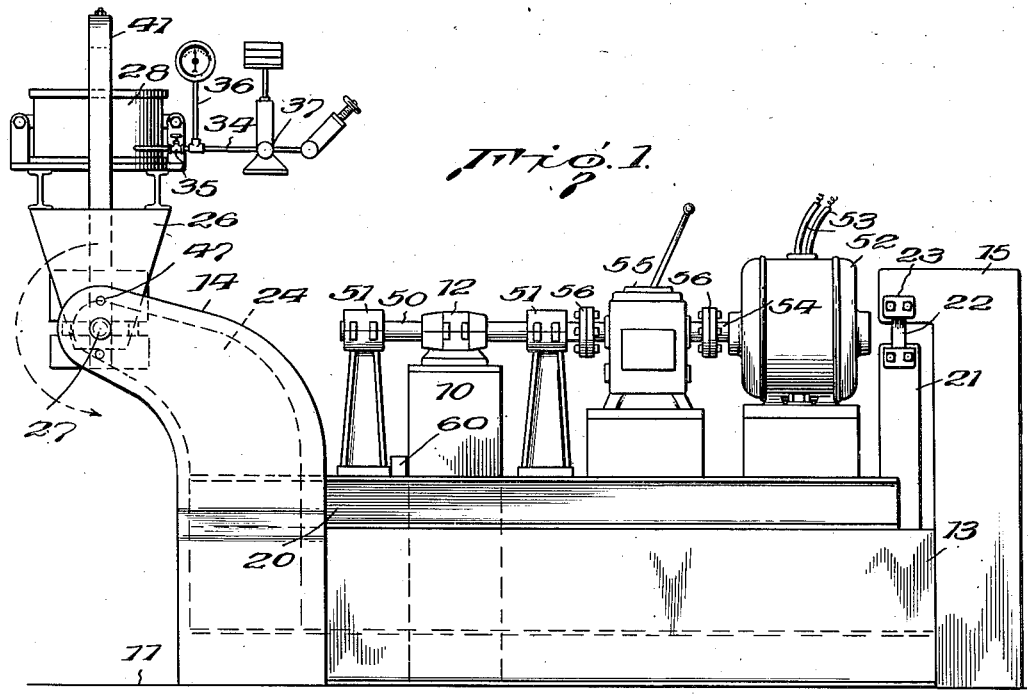
Fig. 1.
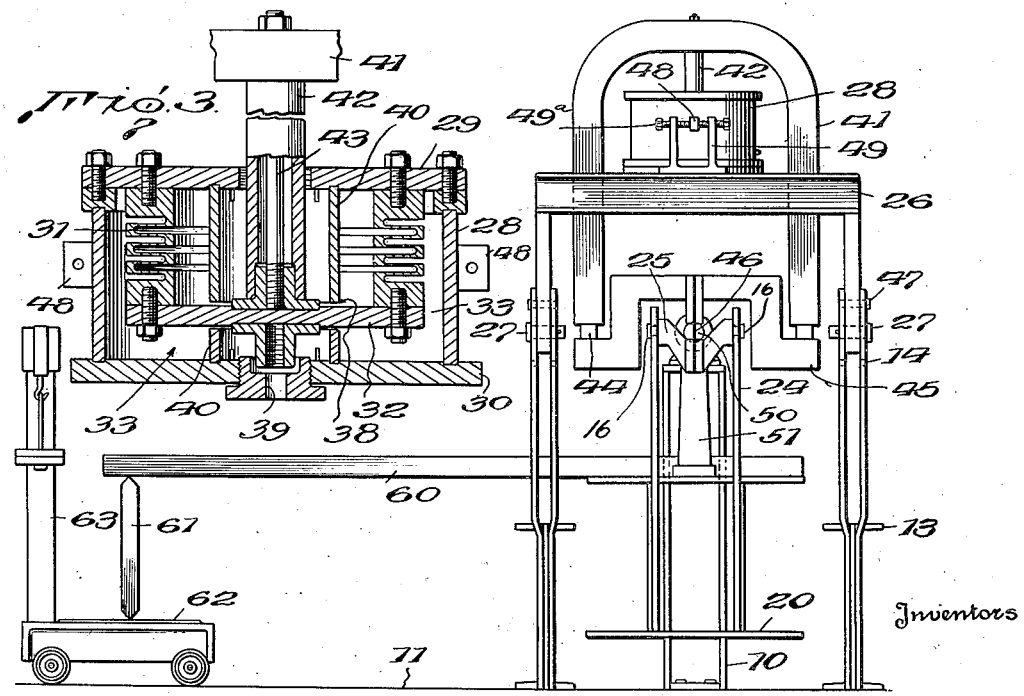
Fig. 3.
Fig. 2.
Inventors
R. J. S. Pigott
A. A. Lane
A. M. Houghton
By
Attorney

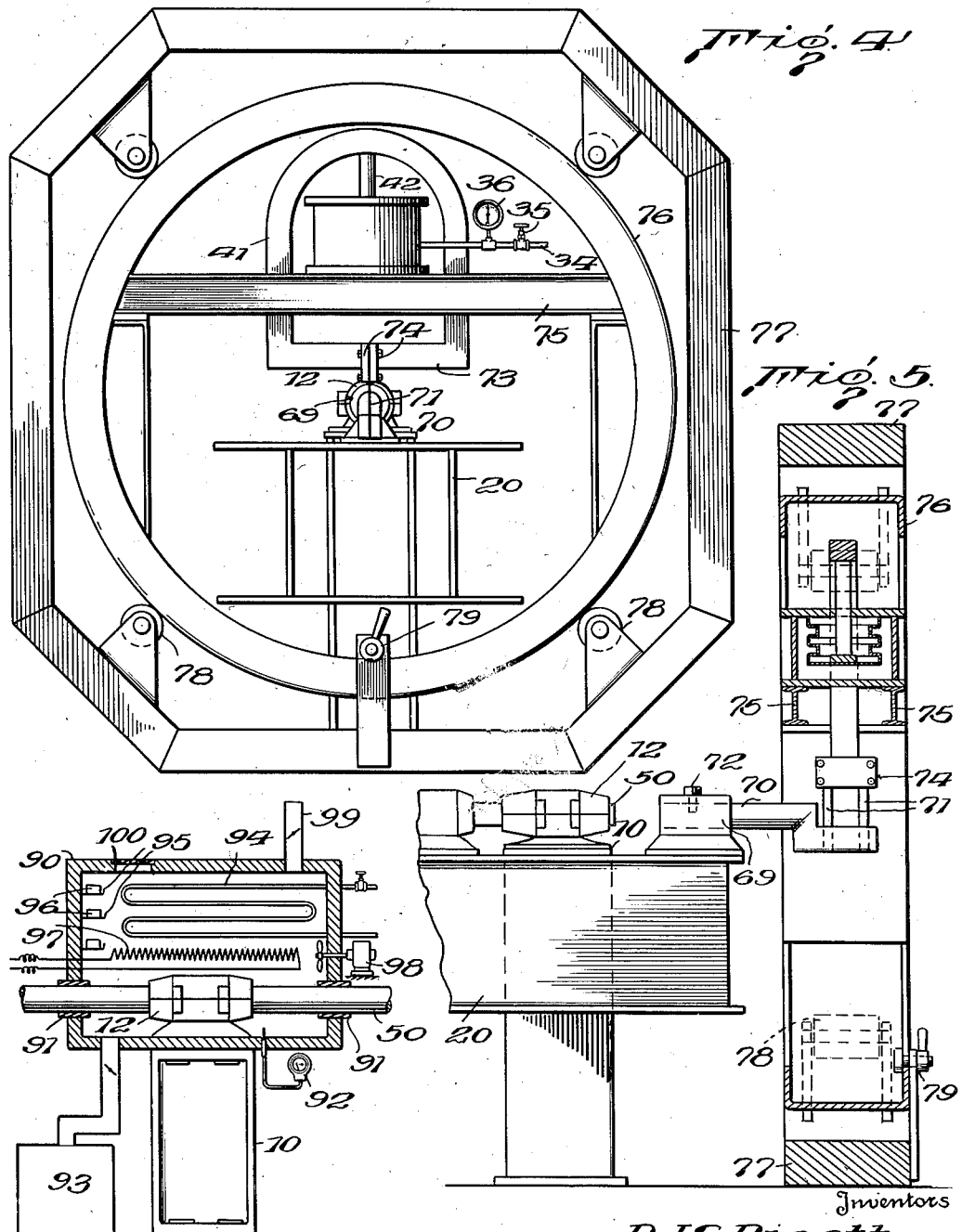

March 10, 1936. R. J. S. PIGOTT ET AL 2,033,588
MACHINE FOR TESTING BEARINGS AND LUBRICANTS
Filed May 14, 1935   3 Sheets-Sheet 3
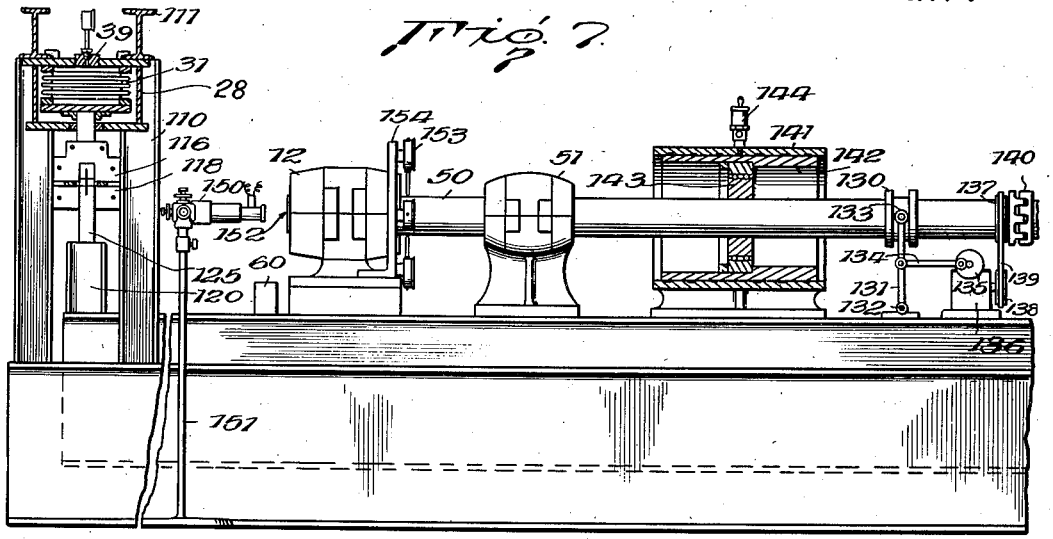
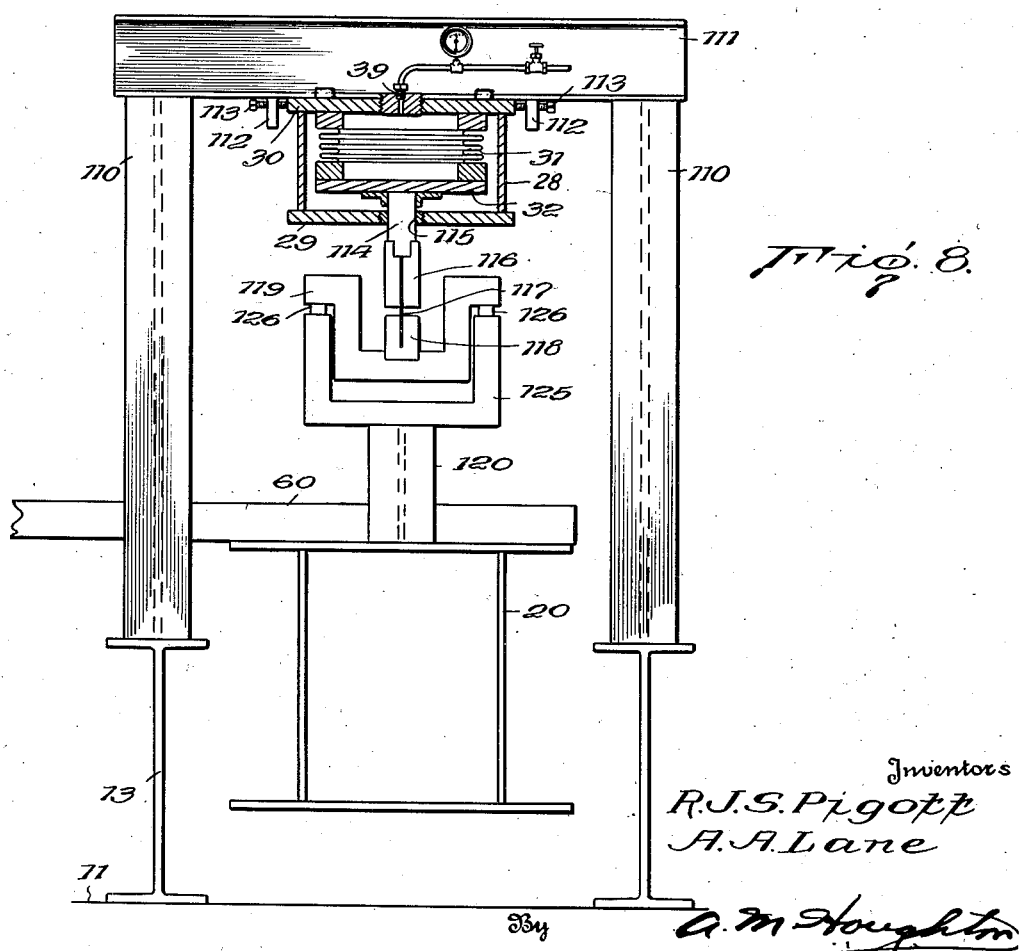

UNITED STATES PATENT OFFICE 2,033,588

MACHINE FOR TESTING BEARINGS AND LUBRICANTS

Reginald J. S. Pigott, Pittsburgh, and Abbot A. Lane, Fox Chapel, Pa., assignors to Gulf Research & Development Corporation, Wilmington, Del., a corporation of Delaware Application May 14, 1935, Serial No. 21,466

7 Claims. (Cl. 265—10)

This invention relates to machines for testing bearings and lubricants; and it comprises dynamometric apparatus for testing bearings, bearing metals and lubricants under simulated operating conditions and comprising a fixed support adapted to hold a bearing for test, a rocking cradle alined with the test bearing, pivot or fulcrum means for supporting the cradle from a fixed base, driving means mounted on the cradle, a shaft coupled with the driving means and extending through the test bearing, adjustable means for drawing the shaft against the test bearing with the desired pressure, means for keeping the test bearing at different degrees of temperature and different atmospheric conditions, and means cooperating with the rocking cradle for indicating the torque resistance of the shaft in the bearing; all as more fully hereinafter set forth and as claimed.

It is a desideratum in the mechanical arts to provide apparatus for accurately testing and determining the characteristics of bearings, bearing metals and bearing lubricants, in which the bearing can be subjected to a wide variety of operating conditions, for example varying stresses and loads, varying supplies of lubricant, and varying temperatures; and to different methods of applying lubricants. No machine hitherto proposed is capable of accomplishing all these purposes satisfactorily.

The present invention provides dynamometric apparatus which includes means for subjecting bearings, bearing metals and bearing lubricants to conditions of load, speed, pressure, temperature, etc., closely simulating a wide variety of conditions encountered in actual operation; and which is capable of indicating or recording, with a hitherto unrealized degree of accuracy, the performance and characteristics of the bearing, bearing metal and lubricant.

The apparatus comprises a fixed support for holding the bearing to be tested and a driving and dynamometric combination arranged on a cradle for angular rocking in a plane perpendicular to the axis of the test bearing. The driving and dynamometric combination includes a shaft running in the test bearing and a motor or other source of power for driving the shaft, speed change gears usually being interposed between the motor and the shaft. The motor is fixed to the cradle. The axis of the shaft coincides with the axis about which the cradle is adapted to rock. The cradle is flexibly hung from a fixed support at one end and the other end is supported by the test bearing. Loading means are provided for loading the test bearing in any desired direction and force measuring and indicating means are provided, response to torque developed in the rocking cradle.

In the accompanying drawings are shown more or less diagrammatically examples of specific embodiments of the invention. In the drawings, Fig. 1 is a view in elevation of one machine embodiment, Fig. 2 is an end view corresponding to Fig. 1, Fig. 3 is a detail sectional view of the loading device of the apparatus of Figs. 1 and 2, Fig. 4 is a view in elevation of another embodiment employing a modified loading means, Fig. 5 is an end view corresponding to Fig. 4.

Fig. 6 is a detail view of a bearing housing for use in the apparatus of Figs. 1 to 5, Fig. 7 is a view partly in elevation, partly in vertical section, of a portion of modified form of the invention, having means for reciprocating the shaft in the test bearing, and Fig. 8 is an end view, partly in elevation and partly in vertical section, of the apparatus of Fig. 7.

In the drawings, in which like characters indicate like parts, a vertical pedestal 10 firmly fixed to a base or floor 11 is provided to receive and retain a bearing 12 to be tested. A stationary massive bed frame 13 advantageously made of structural steel girders is also carried on floor 11. At the left-hand end the bed frame 13 is provided with uprights 14, to hold the bearing loading means; and at the right-hand end, with upright 15.

Hanging inside the bed is a cradle 20, advantageously constructed of girders as shown or of other rigid construction. The cradle is suspended at one end from upright 15, by means of an extension 21 on the cradle, and a fulcrum tape 22, clamped to the extension and to upright 15 by clamps 23, as shown. Each fulcrum tape is a thin strap of elastic, resilient steel, and serves as a frictionless fulcrum for lateral rocking of the cradle. The cradle is suspended at the other end, through extensions 24 and cross beam 25 pivotally mounted as at 16 in the extension ends as shown, from the loading device. The loading device operates by hydraulic or pneumatic pressure and comprises yoke 26 pivoted in the upright 14 by pivots 27, as shown, and carrying a bellows loading device including a casing 28 with top 29 and bottom 30 fastened thereto in fluid-tight connection as shown and a multifold bellows 31 advantageously of steel, mounted therein. Fig. 3 is an enlarged sectional view of the bellows and casing, to show the interior construction. In Fig. 3 the fluid inlet is shown at the bottom of the casing, in bottom 30, as at 39; an arrangement sometimes used. In Figs. 1 and 2 the fluid inlet is at the side of the casing, as shown. The lower end of the bellows is closed by a cap 32. The bellows and casing define a fluid tight pressure space 33, to which fluid, e. g. oil or air, can be admitted under pressure through a pipe 34 provided with valves 35 and pressure gage 36, as shown. A dead weight type tester and gage is provided as indicated at 37, for accurate determination of the pressure applied to the bellows. Sleeves 40 are mounted in the casing, clearing the bellows cap 32 a short distance as indicated at 38. The sleeves prevent excessive movement of the bellows. The bellows cap 32 is operably connected with a U-shaped frame 41 by a thrust bar 42, the cap and frame being tied together by a tie rod 43. The bellows in expanding and contracting is thus adapted to move the U-frame up and down. The ends of the U-frame are attached through fulcrum tapes 44 to a yoke 45, the tapes being alined with pivots 27. The yoke is connected with cross beam 25 by a fulcrum tape 46. The pivots 27 allow the entire bellows loading device to be rotated through 180°, as indicated by the arrow, so as to exert a downward pull when desired. Removable pins 47 are provided to hold the loader in either the position shown or in the lower position, as desired. When the loader is swung into the lower position, pivoted cross-piece 26 swings up through 180 degrees. The loading device can be turned through 90 degrees so as to apply an axial thrust, in case it is desired to utilize the apparatus in testing thrust bearings.

Horizontal adjustment means for the bellows loading device are provided, comprising lugs 48 on the bellows casing, U-shaped clamp supports 49 attached to cross-piece 26 and set screws 49A threaded in the ends of the clamps, engaging the lugs.

The test bearing is tested with the aid of a shaft 50 rotating therein. The shaft is carried on the rocking cradle by bearings 51, which can be of any convenient type but are advantageously of the antifriction roller or ball type. Sometimes the left-hand bearing 51 is omitted. The shaft is driven by a motor 52 mounted on the cradle and having electrical connections 53 and shaft 54 and a speed change device 55, shown as an automobile type gear box or "transmission" capable of giving a number of speed ratios between shafts 54 and 50; advantageously five or more. Flexible couplings 56 are interposed in the shafting on each side of the gear box. In case the gear pox does not give a great enough range of speeds for the work at hand, a multispeed motor, or a motor of different speed can be used, or an additional variable speed device such as a gear box can be interposed between motor and shaft.

One end of the cradle is thus suspended from uprights 15 while the other end is suspended, through shaft 50 and bearings 51, from the test bearing. The weight of one end of the cradle rests entirely upon the test bearing.

Torque in the rocking cradle during operation is measured by means of a force measuring device shown as comprising a rigid beam 60 firmly attached to the cradle and extending laterally and a post 61 resting on the platform 62 of a platform scale 63 of conventional type. The force with which the cradle tends to rock angularly is counter-balanced by weights placed on the beam of scale 63. Other torque measuring means can be employed.

Figs. 4 and 5 are views of a testing machine having a modified form of loading means but otherwise similar to the machine described. The loading device in Figs. 4 and 5 is adapted to allow loading of the test bearing in any direction throughout 360 degrees, and comprises a hydraulic bellows device arranged to be rotated bodily in a ring mount. The bellows and bellows casing and the U-frame are similar to those in Figs. 1 to 3. The end of the cradle is provided with a mount 69 with a stub extension 70 rotatably mounted therein to which are attached fulcrum tapes 71. A set screw 72 in mount 69 engages the extension. The stub extension can be rotated to any angular position and held in position by tightening screw 72. The fulcrum tapes are attached to the ends of the U-frame by a cross-piece 73 and clamps 74, as shown. The bellows casing is fastened to cross-beams 75, which are fixed in a large, flanged ring 76. A stationary mounting frame 77 provided with roller supports 78 supports ring 76. The ring and thus the loading means can be turned to any position throughout 360 degrees, and retained at the desired angle by clamp means indicated at 79. Stub extension 70 is adjusted to correspond with the angular position of the ring.

Fig. 6 shows means for simulating various natural temperature conditions at the test bearing, the device usually being used with the apparatus of Figs. 1 to 5 (and 7 and 8) but being omitted from these views for the sake of clarity. As shown, the device comprises an insulated housing 90 surrounding the bearing and provided with sealing means 91 for shaft 50, closely surrounding but not touching the shaft. Temperature inside the housing is indicated by a recording thermometer 92. An air conditioner 93 of conventional construction is provided for keeping the interior of the housing under temperature conditions simulating a wide variety of natural conditions. To secure hotter or colder conditions, or to assist the work of the conditioner, the housing is provided with cooling coils 94 adapted to be put in communication with a refrigerating medium; trays 95 for holding blocks of solid carbon dioxid indicated at 96; and an electric heating unit 97. A circulating fan 98 is provided to maintain uniform conditions in the housing, and a dampered vent pipe 99 and glass window 100 are provided in the housing, as shown.

Figs. 7 and 8 show apparatus having a modified from of testing device. In this modification the loading means are adapted to deliver only downward loads. As shown, four uprights 110 are provided, attached to bed frame 13 and carrying cross girders 111 at the top. The bellows loading device is attached to these cross girders. It comprises end members 29 and 30 and casing 28 as described in connection with the other figures, end piece 30 resting against girders 111. Lateral adjustment means are provided, comprising lugs 112 attached to the cross girders and set screws 113 in the lugs engaging member 30. Bellows 31 is mounted in the casing and the bellows cap 32 is attached to a movement post 114 extending downwards through a bore 115 in cap 29. The lower end of post 114 has clamping member 116 retaining fulcrum tapes 117. The fulcrum tapes are also clamped by clamp members 118 to a yoke 119. The end of cradle 20 carries an upright 120 to which as fastened a U-frame 125 connected with yoke 119 by fulcrum tapes 126, as shown. In this modification, fluid pressure is applied to the interior of the bellows, through inlet 39. On admission of pressure, the bellows expands and transmits a downward force through the fulcrum tapes, the movement post, the yoke and the U-frame to this end of the cradle.

Figs. 7 and 8 also illustrate the modification of the invention wherein means are provided for reciprocating the shaft 50 in the test bearing. In this modification only one bearing 51 is provided, as shown. The shaft is reciprocated in bearing 51 and in test bearing 12 by means of a flanged collar 130 attached to the shaft and a lever 131 pivoted to the cradle as at 132, having a pivoted roller 133 and a reciprocating arm 134, arranged as shown. The lever is reciprocated by a crank disc 135 rotated through speed reducing mechanism 136 driven from the shaft 50 by pulleys 137 and 138 and belt 139. In this modification a splined coupling 140 is provided between shaft 50 and the gear box, to allow for the reciprocating motion. A reciprocating bearing is provided, comprising a barrel-like stationary mount 141 mounted in the cradle in which a slidable drum or sleeve 142 is provided, retaining a ball bearing 143 attached to the shaft. Lubricating means 144 are provided for this device. The ball bearing serves for additional support for shaft 50, while the sliding sleeve supports the ball bearing; the load being carried by the sleeve and housing. Other means for slidably supporting the ball bearing can be employed.

The reciprocating means, which can be applied to all the apparatus embodiments under the invention, is useful in that it enables actual operating conditions of those types of bearings in which end play occurs, to be accurately simulated and in any case promotes uniform wear. The reciprocating device is ordinarily operated to impart an oscillatory movement along the direction of the axis, of about one-fourth inch per 100 shaft revolutions. This closely imitates actual service conditions, where a journal or shaft floats back and forth.

Figs. 7 and 8 also illustrate the arrangement for determining the shaft position in the bearing under loads. As shown, an illuminated microscope or telescope 150, of conventional form, can be provided, mounted on a stationary stand 151 and directed at the center of the shaft 50, indicated at 152. Displacements of the shaft in the bearing are clearly detectable and measurable by this means. An alternative arrangement is the provision of a plurality of dial type displacement gauges 153 mounted on a fixed support 154. The gauges indicate lateral and vertical displacements of shaft 50.

In the illustrated embodiments of the invention the loading means are shown as arranged to apply load to the cradle at a point well beyond the test bearing. While not essential this arrangement is advantageous in that the loading means secure leverage on the bearing, and apply a greater force thereto than when they engage the cradle at or behind the bearing position, while eliminating multiplying levers and the like.

In testing a bearing with any of the embodiments of the machine described, the bearing is supplied with suitable lubricant, which may be oil, grease, etc. The housing is then brought to the desired conditions of temperature etc. by means of one of the control devices shown. An artificial atmosphere of any composition can be maintained around the bearing. The apparatus should then be left idle long enough for equilibrium to be established between the bearing and the housing. The motor is now started, driving the shaft in the test bearing at a rate depending on the motor speed and the setting of the gear box. Speeds used generally range from 1750 to 100 R. P. M. for large bearing tests; and somewhat higher for small bearings.

If the bearing were perfectly frictionless there would be no tendency for the cradle to rock sidewise; this of course, being true whatever may be the amount of friction in the gear box, support bearings, and motor. Friction in the test bearing has the effect of causing the cradle to tend to rock sidewise. This presses the movement post down on the platform of the scale. Weights are put on the scale beam to counteract this torque. From the weight necessary to counterbalance the torque and from the length of arm 60, the torque and the frictional resistance in the test bearing can be calculated. Torque in the motor and supporting bearings is not registered, because the bearings and motor are mounted on the cradle. Such torque can have no rotatory effect on the cradle. In changing test bearings it is merely necessary to block up the cradle, remove the test bearing and shaft 50 and install a new test bearing and shaft.

Shaft or journal position is readily measured, as described ante. If the machine is provided with roller or ball support bearings, which have very small clearance, shaft position can be found by measuring the displacement of the support bearings relative to test bearing 12, when load is applied.

The loading devices described may be readily adjusted or adapted to provide loading on the bearing in the desired direction. For example, railroad bearings load vertically upward; most pillow block bearings load downward. It may be observed that the present apparatus is well adapted to measure even the largest railway truck bearings, 6.5 by 11 inch, under loads of as much as 25,000 pounds.

It is noted that any frictional resistance in the support bearings or other elements of the machine has no effect on the torque measurement at the scale. This is of considerable advantage, as it reduces the number of variables or disturbing factors to be taken into account. Friction is substantially eliminated from the cradle supports. The fulcrum tape supports are, for all practical purposes, frictionless, although they do supply a small Hooke's law restoring force which can easily be taken into account. The bellows loading device is also friction free. It is a characteristic of metal bellows of the type described that their expansion and contraction is accompanied by substantially no frictional resistance. If desired, piston and cylinder loading means can be substituted for the bellows; but here friction is always associated with piston movement and must be taken into account. The bellows device as described is better. Spring weight or lever and weight loading means can be employed, but the means described are especially convenient.

The machine is simple, sturdy and of universal applicability; that is, it can be used to test bearings, bearing metals and lubricants under a wide range of conditions of loading, speed, operation and lubrication.

What we claim is:—

1. Apparatus for testing bearings, bearing metals or lubricants under simulated operating conditions, comprising a fixed support adapted to hold a bearing for test, a fixed base, a rocking cradle, means for supporting the cradle at one point from the fixed base so constructed and arranged that the cradle is alined with the bearing and is adapted to rock about the axis of the test bearing, power means mounted on the cradle, a shaft driven by the power means and extending through the test bearing, the cradle being supported on the test bearing at a point spaced from the first point of support, adjustable loading means for the bearing so constructed and arranged as to apply load to the cradle at a point beyond the test bearing so that leverage on the bearing is obtained, and means for indicating the torque resistance of the bearing.

2. Apparatus for testing bearings, bearing metals and lubricants under simulated operating conditions and comprising a fixed support adapted to hold a bearing for test, a fixed base, a rocking cradle having the rocking axis alined with the test bearing, power means mounted on the cradle, a shaft coupled with the power means and extending through the test bearing, means for supporting one end of the cradle from the fixed base, loading means for the test bearing, and means cooperating with the rocking cradle for indicating the torque resistance of the bearing.

3. Apparatus of the type described and comprising a fixed support adapted to hold a bearing for test, a fixed base, a rocking cradle having the rocking axis coinciding with that of the test bearing, a shaft extending through the test bearing, power means mounted on the cradle and driving the shaft, bearing means for mounting the shaft on the cradle, whereby the cradle at one end is suspended from the test bearing, means for supporting the other end of the cradle from the fixed base, loading means for the bearing and means for indicating the torque resistance of the bearing.

4. In apparatus of the type described and including a stationary test bearing and a shaft running in the bearing, loading means for the test bearing comprising a fluid tight casing, a bellows in the casing, a movement post attached to the end of the bellows, and separate bearing means operatively connecting the movement post with the shaft so that movement of the bellows draws the shaft against the bearing.

5. In apparatus of the type described and having a stationary support for receiving a test bearing and a shaft rotating in the bearing, loading means for subjecting the test bearing to load by the shaft in different directions and comprising a fluid tight casing, bellows mounted in the casing and separate bearing means operatively connecting the bellows with the shaft, and means for swinging the bellows and casing angularly with respect to the test bearing.

6. Apparatus of the type described comprising a fixed support adapted to hold a bearing for test, a rocking cradle having a rocking axis coinciding with that of the test bearing, a shaft and means for supporting the shaft on the cradle, the shaft extending through the test bearing so that the cradle is supported at one end on the test bearing, means for supporting the other end of the cradle from a fixed base, driving means mounted on the cradle and driving the shaft, means cooperating with the driving means for varying the speed at which the shaft is driven, means for loading the bearing, and weighing scale means operable by rocking of the cradle, for indicating torque in the test bearing.

7. Apparatus of the type described comprising a fixed support adapted to hold a bearing for test, a shaft rotatable in the bearing, means for loading the shaft against the bearing, and driving means for the shaft, the driving means being adapted for rocking about the axis of rotation of the shaft, and torque indicating means responsive to rocking of the driving means, so that frictional resistance in the driving means is not communicated to the torque-indicating means.

REGINALD J. S. PIGOTT.
ABBOT A. LANE.